US007843081B2

(12) United States Patent
Lim

(10) Patent No.: US 7,843,081 B2
(45) Date of Patent: Nov. 30, 2010

(54) POWER-CONTROLLABLE OUTLET RECEPTACLE

(76) Inventor: Seong-Kyu Lim, 7-202, Cheongun Mansion, 111-1, Daebong-dong, Jung-gu, Daegu (KR) 700-442

( * ) Notice: Subject to any disclaimer, the term of this patent is extended or adjusted under 35 U.S.C. 154(b) by 246 days.

(21) Appl. No.: 12/095,187

(22) PCT Filed: Nov. 27, 2006

(86) PCT No.: PCT/KR2006/005023

§ 371 (c)(1),
(2), (4) Date: May 28, 2008

(87) PCT Pub. No.: WO2007/064118

PCT Pub. Date: Jun. 7, 2007

(65) Prior Publication Data

US 2008/0309164 A1 Dec. 18, 2008

(30) Foreign Application Priority Data

Nov. 30, 2005 (KR) .................. 20-2005-0033817 U
Nov. 30, 2005 (KR) .................. 20-2005-0033818 U

(51) Int. Cl.
*H02J 3/14* (2006.01)
*H02J 3/00* (2006.01)

(52) U.S. Cl. .......................................... 307/39; 307/11

(58) Field of Classification Search .................. 307/11, 307/39
See application file for complete search history.

(56) References Cited

U.S. PATENT DOCUMENTS 6,211,581 B1 * 4/2001 Farrant ....................... 307/117
6,870,141 B2 * 3/2005 Damrath et al. ............. 219/490
7,141,891 B2 * 11/2006 McNally et al. ............... 307/39

FOREIGN PATENT DOCUMENTS

KR 20-1998-021672 7/1998
KR 20-0258711 12/2001
KR 20-0341470 2/2004
KR 10-2005-0028479 3/2005

OTHER PUBLICATIONS

International Search Report mailed on Feb. 27, 2007 for PCT/KR2006/005023.

* cited by examiner

*Primary Examiner*—Jared J Fureman
*Assistant Examiner*—Dru M Parries
(74) *Attorney, Agent, or Firm*—Lowe Hauptman Ham & Berner LLP

(57) ABSTRACT

A multi-type power strip includes a main body having connecting sockets with surfaces indicated by priority of supplying electric power to the connecting sockets, operation lamps, and an electric circuit installed in the main body. The circuit interfaces with a remote controller through RF, and checks statuses of loads connected to the main body to switch plural switches based on the priority when the load exceeds a threshold. An intermediate type power strip includes intermediate socket main bodies inserted into sockets and respectively having at least one connecting socket, and a remote controller to individually control the intermediate socket main bodies in remote through RF communication. The surfaces of the intermediate socket main bodies are distinguished by indicators. When switch status of the intermediate socket main bodies is requested by the remote controller, the status is displayed by lamps of a socket controlling button of the remote controller.

11 Claims, 9 Drawing Sheets

POWER-CONTROLLABLE OUTLET RECEPTACLE

CROSS REFERENCE TO RELATED APPLICATION

This application claims the priority of Korean Patent Application No. 20-2005-0033817, filed on Nov. 30, 2005 and Korean Patent Application No. 20-2005-0033818, filed on Nov. 30, 2005, in the Korean Intellectual Property Office, the disclosure of which are incorporated herein in their entirety by reference. Further, this application is the National Phase application of International Application No. PCT/KR2006/005023, filed Nov. 27, 2006, which designates the United States and was published in English. This application, in its entirety, is incorporated herein by reference.

TECHNICAL FIELD

The present invention relates to a power control apparatus, and more particularly, to method and an outlet receptacle capable of controlling electric power.

BACKGROUND ART

Electrical receptacles are commonly used in offices and homes. When an electric product requiring electric power such as a computer, a home appliance, an electric heater, a kitchen apparatus, and the like is remote from a main wall socket installed in a wall, a power strip is widely used to connect the electric product to the power source.

The power strip includes a plurality of electrical outlets such that many electric plugs are inserted into the electrical outlet to use the plural electric products. Thus, the power strip has a risk of overload all the time. Since the plugs of the electric products are always inserted into the outlets, electric current is applied to the inactive electric products and thus unnecessary current is consumed.

In order to prevent this, although a power strip having switches installed in respective electric outlets has been developed such that a user can turn the switches on or off individually, it is very bothersome for the user to turn on/off the switches of the respective outlets one by one.

DISCLOSURE OF INVENTION

Technical Problem

Therefore, the present invention has been made in view of the above and/or other problems, and it is an object of the present invention to provide a power strip in which a user can control individual electric outlets provided in a body of the power strip remotely.

It is another object of the present invention to provide a power strip to prevent overload when the overload is generated in a body of the power strip and to be controlled to continuously supply electric power to an electric product that must be supplied with electric power with top priority.

It is still another object of the present invention to provide a power strip in which operating statuses of respective outlets can be remotely monitored.

It is still another object of the present invention to provide a power strip in which a user controls respective intermediate socket bodies that are inserted into outlets such that electric power supplied to respective electric products can be individually controlled.

It is still another object of the present invention to provide a power strip in which powered status of a plurality of intermediate sockets connected to the power strip can be remotely monitored.

Technical Solution

In accordance with the present invention, the above and other objects can be accomplished by the provision of a multi-type power strip comprising: a main body including a plurality of connecting sockets having surfaces indicated by priority of supplying electric power to the respective connecting sockets, operation lamps, and an electric circuit installed in the main body of the multi-type power strip; the electric circuit comprising: a plurality of switches corresponding to the plural connecting sockets to selectively form a commercial power supplying path by a predetermined switch control; a current detector to detect electric current flowing through a power cable of the multi-type power strip and to output a load status; a radio frequency transmitting and receiving unit to a radio frequency control signal to and from an external remote controller; and a controller to control the switches to be switched based on a switch remote controlling signal of the remote controller through the radio frequency transmitting and receiving unit, and to control the plural switches to be switched based on a predetermined priority of supplying electric power when the output of the load status from the current detector exceeds a predetermined overload threshold.

Another object of the present invention is achieved by the provision of an intermediate type power strip comprising: a plurality of intermediate socket main bodies inserted into sockets and respectively including at least one connecting socket; a remote controller to individually control the plural intermediate socket main bodies in remote through a radio frequency communication; wherein respective surfaces of the intermediate socket main bodies are distinguished by indicators; wherein the remote controller comprises: socket controlling buttons respectively corresponding to the plural intermediate socket main bodies; light emitting lamps respectively corresponding to the socket controlling buttons; and an electric circuit; wherein the electric circuit comprises: a memory to store allocation index codes with respect to the respective intermediate socket main bodies; a keypad including a lamp button to check statuses of the socket controlling buttons and respective switches installed in the respective intermediate socket main bodies to generate key data corresponding to a button that is pressed; a radio frequency transmitting and receiving unit to perform a radio frequency communication with the intermediate socket main bodies under a pre-determined control; and a remote controller controlling unit to request to check the status of the switches to the intermediate socket main bodies through the radio frequency transmitting and receiving unit when the key data corresponding to the lamp button is inputted from the keypad, to control the light emitting lamps to be turned on or off according to a response for the request to check the statuses of the switches when the response for the request to check the statuses of the switches is received from the intermediate socket main bodies, and to transmit the switch remote controlling signal to a corresponding intermediate socket main body through the radio frequency transmitting and receiving unit via a wireless line when the key data corresponding to a socket controlling button is inputted.

ADVANTAGEOUS EFFECTS

As described above, according to the present invention, outlets of a body of a power strip can be individually controlled to supply electric power by a user and electric power can be continuously supplied to an electric product that must be powered with priority while preventing overload when the overload is generated in a body of the power strip. Moreover, operating statuses of individually controlled connecting sockets of the power strip or operating status of a plurality of intermediate sockets connected to respective outlets can be remotely monitored.

BEST MODE FOR CARRYING OUT THE INVENTION

Figure 1:
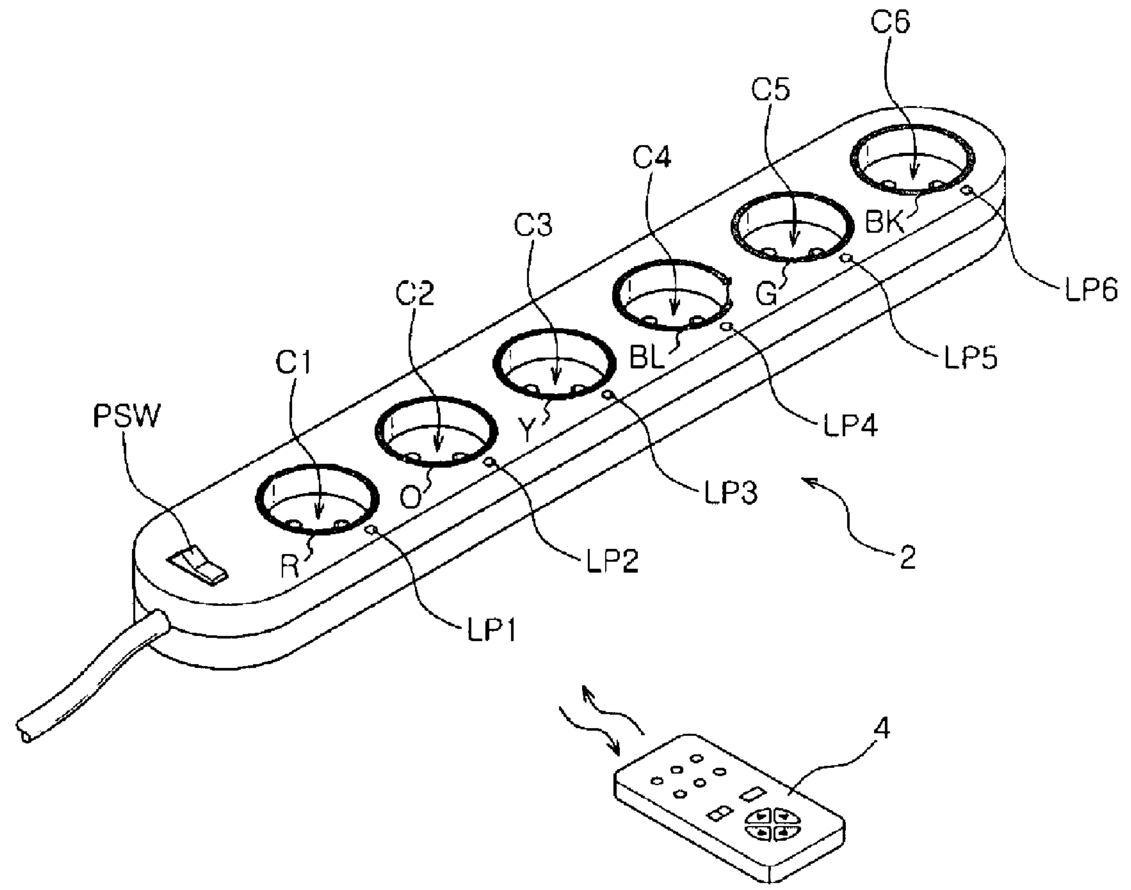
FIG. 1 is a view illustrating an external appearance of a multi-type power-controllable power strip according to an embodiment of the present invention.

Hereinafter, embodiments of the present invention will be described with reference to the accompanying drawings. It should be pointed out that the same numerals in the drawings are assigned to the same components. Moreover, the description for the conventional function and structure that may confuse spirit of the present invention will be omitted.

A power strip illustrated in FIGS. 1 to 5 relates to a multi-type power strip having multiple outlets according to an embodiment of the present invention, and a power strip illustrated in FIGS. 6 to 11 relates to an intermediate type power strip according to another embodiment of the present invention.

Firstly, the multi-type power strip according to the embodiment of the present invention will be described in detail with reference to FIGS. 1 to 5.

FIG. 1 illustrates a view illustrating an external appearance of the power-controllable multi-type power strip according to an embodiment of the present invention and the power-controllable multi-type power strip includes a main body 2 and a remote controller 4.

The main body 2 and the remote controller 4 are implemented to perform a short-range radio frequency (RF) communication at a commercial frequency broadband such that a user can control individual power of plural connecting electric sockets that are provided in the main body 2 with the remote controller 4 at a remote location.

The main body 2, like a conventional multi-type power strip, includes a power switch PSW and a plurality of connecting sockets, for example, six connecting sockets C1 to C6. However, the main body of the multi-type power strip according to the embodiment of the present invention, unlike the conventional multi-type power strip, includes color indicators painted on upper circumferences of the connecting sockets C1 to C6 to indicate priority of supplying electric power, namely, red R, orange O, yellow Y, blue BL, green G, and black BK and operation lamps LP1 to LP6 corresponding to the connecting sockets and installed at sides of the connecting sockets C1 to C6. The color indicator R among the color indicators R, O, Y, BL, G, and BK has the highest priority, the color indicator O has a second highest priority, the priorities become lower in the order of the color indicators Y, BL, and G, and the black indicator BK has the lowest priority.

It will be apparent to those skilled in the art that the number of the connecting sockets and the color indicators of the main body 2 of the multi-type power strip are described as an example and can be variously changed and modified within the scope and the spirit of the present invention.

Thus, a user just puts plugs of important electric products into the connecting sockets C1 and C2 belonging to a group having the highest priority and puts plugs of electric products that are not frequently used or less important into the connecting sockets C6 and C5 having the lowest priority.

By constructing the main body 2 of the multi-type power strip, when overload is generated, the electric power is continuously supplied to an electric product in which the overload is prevented and the electric power must be supplied firstly.

Figure 3:
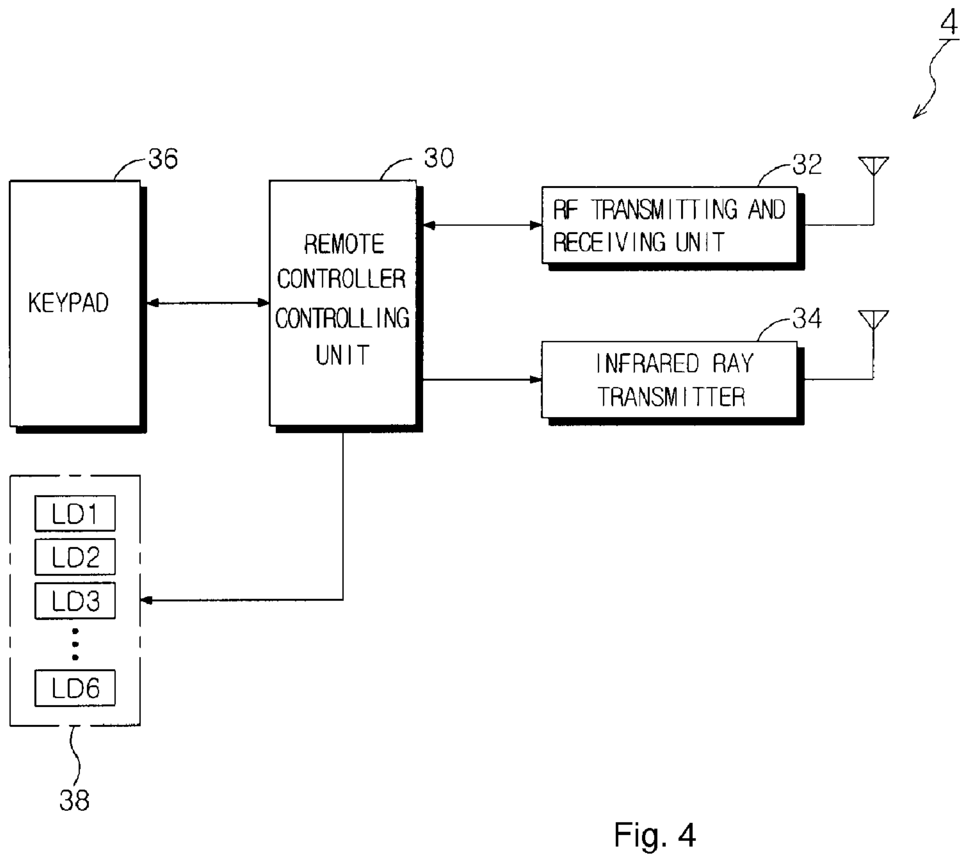
FIG. 3 is a block diagram illustrating a circuit of a remote controller of the multi-type power strip in FIG. 1.
Figure 4:
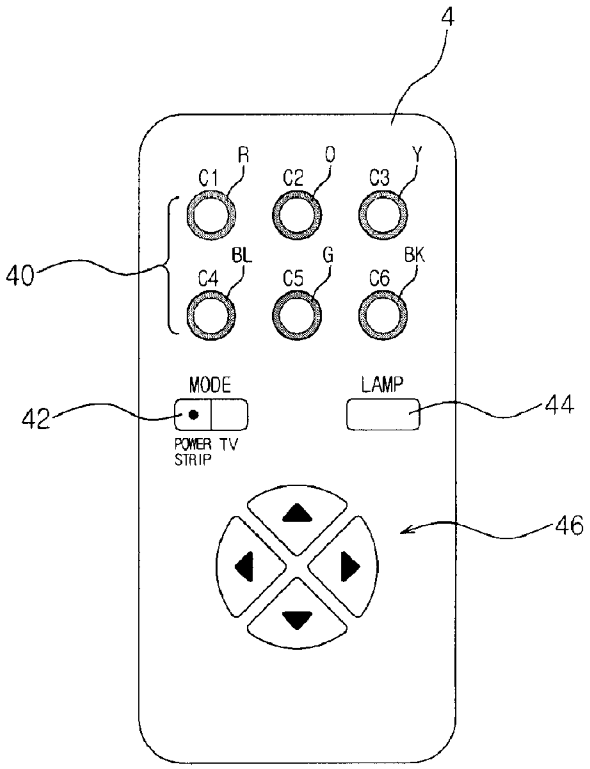
FIG. 4 is a view illustrating an external appearance of the remote controller in FIG. 3.

Meanwhile, the remote controller 4 illustrated in FIG. 1, as illustrated in FIG. 4, includes a socket controlling button unit 40 having as many socket controlling buttons as the number of the connecting sockets (for example, 6) provided in the main body 2 in which the same color indicators as the color indicators such as red R, orange O, yellow Y, blue BL, green G, and black BK, painted on the respective connecting sockets C1 to C6 of the main body 4 of the multi-type power strip are painted on the outer circumferences of the six buttons. The buttons are, for example, transparent or semitransparent caps, and light emitting lamps LD1 to LD6 corresponding to the buttons are installed in a case of the remote controller 4 below the buttons. A keypad 36 (See FIG. 3) of the remote controller 4 includes a mode switch 42 to select one of a power strip mode and a television mode, a lamp button to request to check statuses of the respective connecting sockets C1 to C6 of the main body 2, and an adjustment button 46 to adjust channels and volume at the television mode.

The remote controller 4 has a function of remotely controlling power supplying paths to the connecting sockets of the main body 2 and a television function, and as illustrated in FIG. 3, includes a remote controller controlling unit 30, a radio frequency (RF) transmitting and receiving unit 32, an infrared ray transmitter 34, a keypad 36, and a light emitting lamp 38.

The remote controller controlling unit 30 controls overall operation of the remote controller 4, the RF transmitting and receiving unit 32 is a block to perform RF communication with the main body 2 at the commercial frequency broadband, the infrared ray transmitter 34 transmits an infrared signal to a television when the television mode is selected. The keypad 36 includes the socket controlling button unit 40, the mode switch 42, the lamp button 44, and the adjustment button 46 that are described with reference to FIG. 4, and supplies corresponding key data to the remote controller controlling unit 30 when the user presses a key. The light emitting lamp 38 includes three color light emitting lamps LD1 to LD3 installed in the lower sides of the socket controlling buttons as many as the number of the connecting sockets and are turned on or off under the control of the remote controller controlling unit 30.

Figure 2:
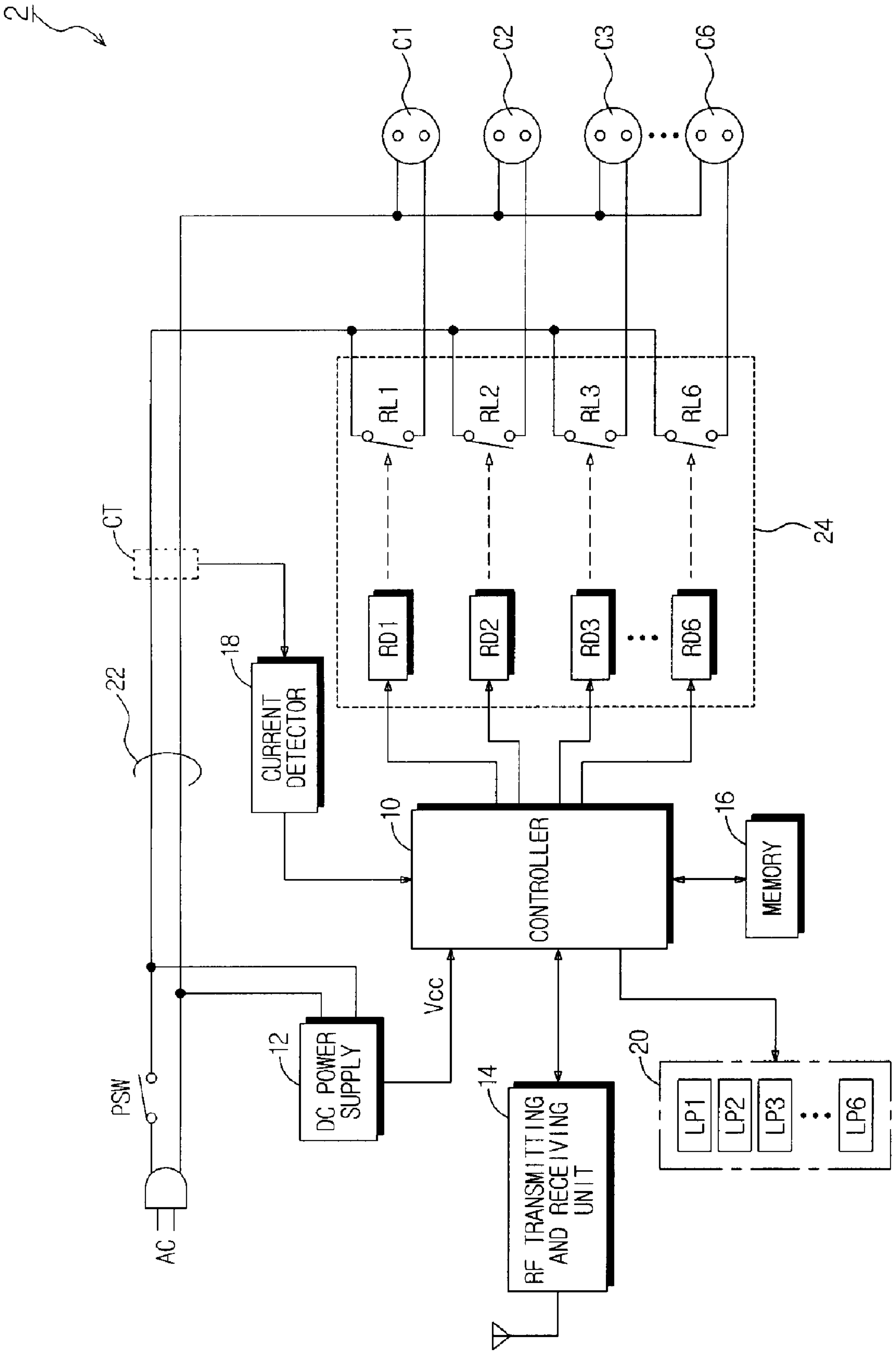
FIG. 2 is a block diagram illustrating a circuit of a main body of the multi-type power strip in FIG. 1.

The main body 2 of the multi-type power strip in FIG. 1 includes a main body electric circuit as illustrated in FIG. 2.

Referring to FIG. 2, the main body electric circuit includes a controller 10, a direct current power supply 12, a radio frequency (RF) transmitting and receiving unit 14, a memory 16, a current transformer CT, a current detector 18, an operating lamp unit 20 having a plurality of operation lamps LP1 to LP6, and a switching unit 24.

The switching unit 24 includes a plurality of relay switches RL1 to RL6 corresponding to and connected to the plural connecting sockets C1 to C6 and relay driving units RD1 to RD6. The relay driving units RD1 to RD6 switch the switches RL1 to RL6 under the controller 10 to selectively form commercial alternating current (AC) power supplying paths to the connecting sockets C1 to C6.

The CT wraps power cable 22 in the main body 2 of the multi-type power strip, converts a magnetic field generated when the electric current flows through the power cable 22 into the electric current, and outputs the converted current to the current detector 18, and then the current detector 18 supplies voltage corresponding to the converted current to the controller 10. Thus, the controller 10 can check the load status of the electric power supplied to various electric products whose plugs are inserted into the connected sockets C1 to C6 of the main body 2 of the multi-type power strip based on the voltage supplied from the CT and the current detector 18.

The RF transmitting and receiving unit 14 is a block to transmit and receive a radio frequency (RF) signal to and from the external remote controller 4 at the commercial frequency broadband, the DC power supply 12 converts the commercial power AC into the DC power and supplies the converted DC power to the controller 10 and other circuits. The plural operation lamps LP1 to LP6 of the operation lamp unit 20 are installed at upper sides of the connecting sockets C1 to C6 of the main body 2 as illustrated in FIG. 1 and are selectively turned on by the controller 10.

In the memory 16 in FIG. 2, an operation program is mapped, data relating to the priority of supplying power and data such as an overload threshold are stored, and various data is stored and read out under the control of the controller 10.

The controller 10 switches the relay switches RL1 to RL6 of the switching unit 24 based on a switch remote controlling signal of the remote controller 4 supplied through the RF transmitting and receiving unit 14, and switches the relay switches RL1 to RL6 of the switching unit 24 based on the predetermined priority of supplying power when a voltage corresponding to the load state supplied from the current detector 18 exceeds a predetermined overload threshold. The controller 10 controls some of the operation lamps LP1 to LP6, corresponding to the switches to currently supply power, to be turned on and transmits a current power switch status to the remote controller 4 in response to the request of the power switch status from the remote controller 4.

A reference numeral P in FIG. 2 is assigned to a plug.

Figure 5:
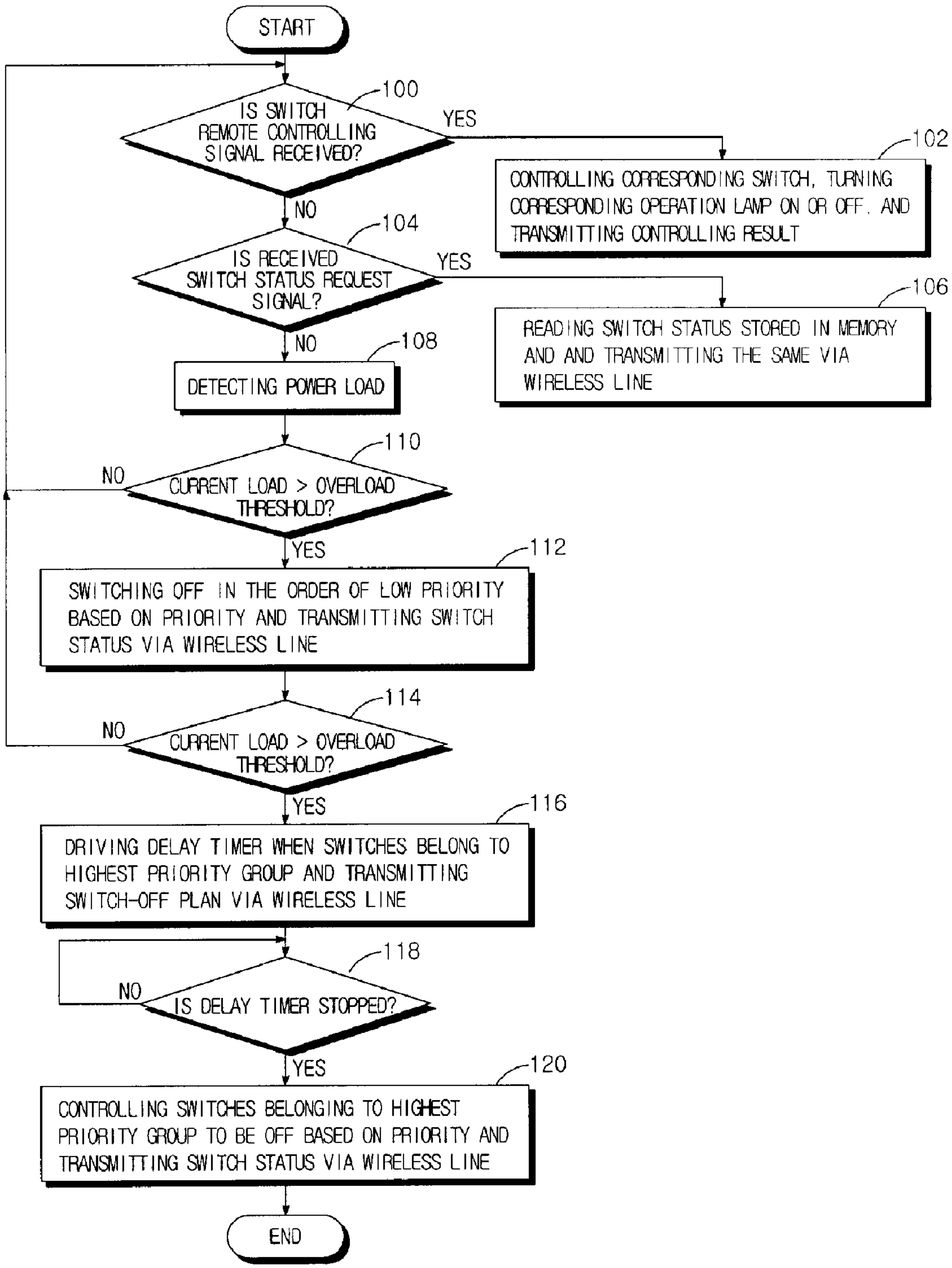
FIG. 5 is a flowchart illustrating control performed by a controller of the main body of the multi-type power strip in FIG. 2.

FIG. 5 is a flowchart illustrating control performed by the controller 10 of the main body 2 of the multi-type power strip in FIG. 2.

Hereinafter, the embodiment of the present invention will be described in detail with reference to the accompanying drawings as follows.

The user checks the color indicators of the main body 2, inserts the plug of the important electric product having a higher priority into the connecting socket C1 or C2, and inserts the plug of the electric product that is not frequently used or less important into the connecting socket C6 or C5 having the lowest priority.

The entire connecting sockets C1 to C6 of the main body 2 are controlled to supply the commercial power to the electric products whose plugs are inserted into the connecting sockets C1 to C6, but can be individually controlled to supply the commercial power when the switches are remotely controlled by the remote controller 4 or the overload is detected.

The controller 10 of the main body 2 normally controls the respective relay switches RL1 to RL6 of the switching unit 24 to be turned on, and simultaneously controls the entire operation lamps 20 of the operation lamp unit 20 to be turned on green. By doing so, the commercial power is supplied to the electric products whose plugs are inserted into the connecting sockets C1 to C6, and the operation lamps 20 respectively positioned in the connecting sockets C1 to C6 are turned on green.

However, the light emitting lamps LD1 to LD6, which are installed in the lower sides of the respective buttons of the socket controlling button unit 40 respectively corresponding to the connecting sockets C1 to C6 of the remote controller 4, are turned off initially, and are turned on or off according to the response for the request to check the statuses of the switches from the main body 2 after the user presses the lamp button 44 for the request.

In other words, when the user presses the lamp button 44 to request the status of the switches, the remote controller controlling unit 30 transmits the status of the switches through the RF transmitting and receiving unit 32 via a wireless line and the controller 10, that has received the signal of requesting the status of the switches through the RF transmitting and receiving unit 14 of the main body of the multi-type power strip, reads the statuses of the switches stored in the memory 16 and transmits a response signal for the request to check the statuses of the switches to the remote controller 4 via a wireless line (operations 104 and 106 in FIG. 5). By doing so, the remote controller controlling unit 30 controls the light emitting lamps LD1 to LD6 of the light emitting lamp unit 38 to be turned on or off based on the response signal for the request to check the status of the switches. The green lighting of the light emitting lamp unit 38 of the remote controller 30 is turned off when a predetermined time (for example, about 30 seconds) lapses so that the consumption of a battery of the remote controller 4 can be reduced.

The user watches the statuses of turning the respective buttons of the socket controlling button unit on or off to get hold the current statuses of the connecting sockets C1 to C6 of the main body of the multi-type power strip and to individually control desired connecting sockets to supply electric power. Particularly, since the color indicators are identical to the color indicators on the upper circumferences of the respective connecting sockets C1 to C6 of the main body 2, the user can easily find the desired connecting sockets to supply electric power.

When the user presses one of the buttons among the buttons of the socket controlling button unit 40 to be individually controlled, the remote controller controlling unit 30 of the remote controller 4 transmits a switch remote controlling signal corresponding the pressing of the button through the RF transmitting and receiving unit 32 and the controller 10 of the main body 2 receives the same to control the corresponding relay switch of the switching unit 24 and to turn the corresponding operation lamp of the operation lamp unit 20 on or off (operations 100 and 102 in FIG. 2). Moreover, a result of controlling the relay switches is transmitted to the remote controller 4 via a wireless line so that the remote controller controlling unit 30 newly turns on or off a light emitting lamp corresponding to the connecting socket, that is individually controlled to supply electric power, green. By doing so, the button pressed by the user is directly indicated by lighting in green or turning off.

Due to the above-mentioned control, the user can individually control the connecting sockets of the main body 2 of the multi-type power strip remotely and can monitor the current statuses of the connecting sockets to individually supply electric power if necessary.

Meanwhile, the controller 10 of the main body 2 periodically detects the status of power load applied to the main body 2 of the multi-type power strip through the current detector 18 and checks whether a current load is greater than a predetermined overload threshold stored in the memory or not (operations 108 and 110 in FIG. 5). The predetermined overload threshold can be decided from 80% to 130% of a rated load.

In the determination of the operation 110 in FIG. 5, if the current load is greater than the predetermined overload threshold, the controller 10 turns the relay switches of the switching unit 24 off in the reverse order of the priority based on the priority and checks the current load (operations 112 and 114 in FIG. 5). Additionally, the result of turning the relay switches off is transmitted to the remote controller 4 via a wireless line (operation 112 in FIG. 5) so that the remote controller controlling unit 30 controls the light emitting lamps (for example, the light emitting lamps LD6 and LD5) corresponding to the powered-off connecting sockets to be turned off after a pre-determined time has lapsed.

Since the power plugs of the electric product that are not important or not frequently used are inserted in advance into some of the connecting sockets C1 to C6 of the main body 2 of the multi-type power strip having lower priority, for example, the connecting sockets C6 and C5, there is no fear of generating a critical problem even when the electric power is not supplied.

Due to the control in the present invention as described above, when the overload is generated in the main body of the multi-type power strip, the overload can be prevented and the electric power can be continuously supplied to the electric product that the electric power must be supplied to with top priority.

If, although the switches of the switching unit 24 are turned off and the switches belonging to the highest priority group are turned on based on the priority, a state of generating the overload is continued, the controller 10 of the main body 2 of the multi-type power strip does not turn the corresponding switches having the highest priority group off directly but drives a delay timer for few tens seconds or few tens minutes and transmits a switch turning-off plan notifying signal to the remote controller controlling unit 30 via a wireless line (operation 116 in FIG. 5). By doing so, the remote controller controlling unit 30 controls the light emitting lamps LD2 and LD1 corresponding to the connecting sockets belonging to the highest priority group to be turned off to twinkle yellow.

As light emitting lamps of the respective buttons corresponding to the connecting sockets in the highest priority group twinkle yellow, the user can manage to move the plugs of the corresponding electric products to other connecting sockets.

When the delay timer is stopped (operation 118 in FIG. 5), the controller of the main body 2 of the multi-type power strip controls the switches having the lower priority among the switches belonging to the highest priority group to be turned off and transmits the result of turning the relay switches off to the remote controller 4 via a wireless line (operation 120 in FIG. 5). By doing so, the remote controller controlling unit 30 controls the light emitting lamps (for example, the light emitting lamps LD2 and LD1) twinkling yellow and corresponding to the powered-off connecting sockets to be turned off after twinkling red for a predetermined time.

Meanwhile, the remote controller 4 can be used as a remote controller for a television in addition to the function of individually controlling the connecting sockets of the main body 2 of the multi-type power strip to supply electric power.

In other words, since the mode switch 42 is provided on the keypad 36 of the remote controller 36, the user switches the mode switch 42 from "POWER STRIP" to "TV" so that the remote controller controlling unit 30 is switched to the television mode. In the television mode, the user presses the adjustment button 46 up, down, right, and left so that channels and volume of the television can be adjusted.

In more detailed description, when the user presses the adjustment button 46 up, down, right, and left at the television mode, the keypad 36 applies key data corresponding to the press of the adjustment button 46 to the remote controller controlling unit 30 and the remote controller controlling unit 30 transmits a corresponding infrared signal to the television through the infrared ray transmitter 34.

Next, an intermediate type power strip according to another embodiment of the present invention will be described in detail with reference to FIGS. 6 to 11.

Figure 6:
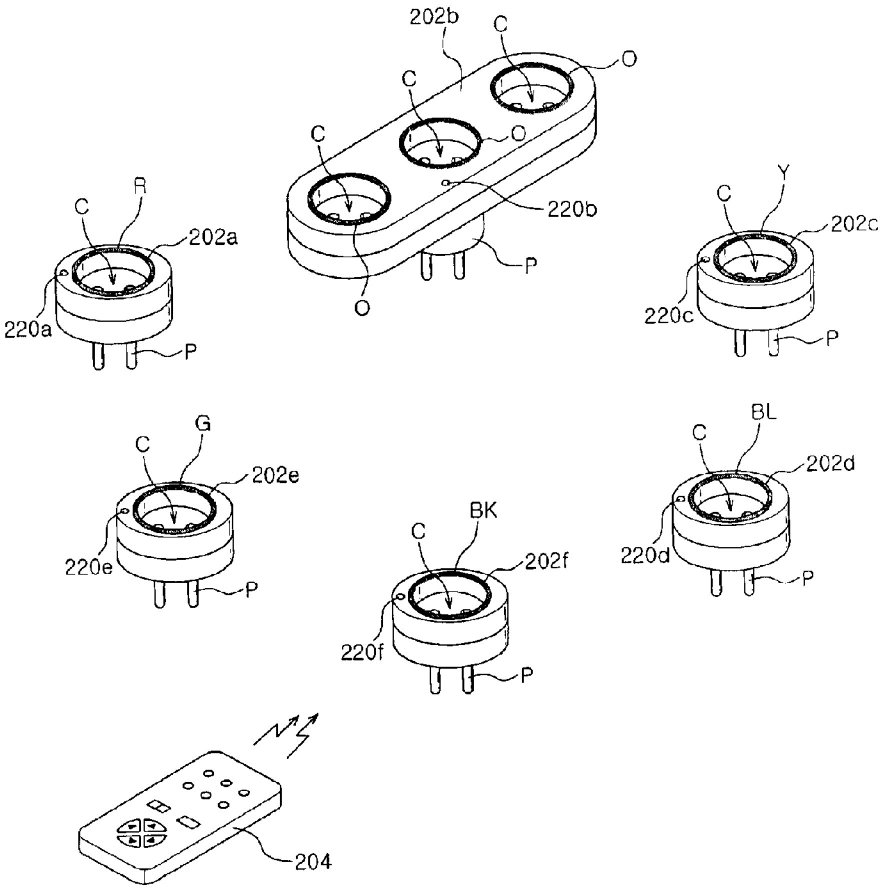
FIG. 6 is a perspective view illustrating an intermediate type power strip capable of controlling electric power according to another embodiment of the present invention.

FIG. 6 is a perspective view illustrating an intermediate type power strip capable of individually controlling a plurality of intermediate socket main bodies to supply electric power according to another embodiment of the present invention, and the intermediate type power strip includes a plurality of intermediate socket main bodies 202*k* (k=a, b, c, d, e, and f) and a remote controller 204 to individually control the plural intermediate socket main bodies 202*k* remotely via a wireless line.

The plural intermediate socket main bodies 202*k* have plugs P to be inserted into the main power socket or the multi-type power strip and at least one connecting socket C. The plural intermediate socket main bodies 202*k* include color indicators painted on respective upper circumferences thereof in red R, orange O, yellow Y, blue BL, green G, and black BK and operation lamps 220*k* (k=a, b, c, d, e, and f) LP1 to LP6 corresponding to the intermediate socket main bodies and installed on respective upper circumferences thereof.

It will be apparent to those skilled in the art that the number of the intermediate socket main bodies 202*k* and the color indicators of the intermediate socket main bodies 202*k* are described as an example and can be variously changed and modified within the scope and the spirit of the present invention. The plural intermediate socket main bodies 202*k* are preferably sold as a package together with the remote controller 204.

Figure 9:
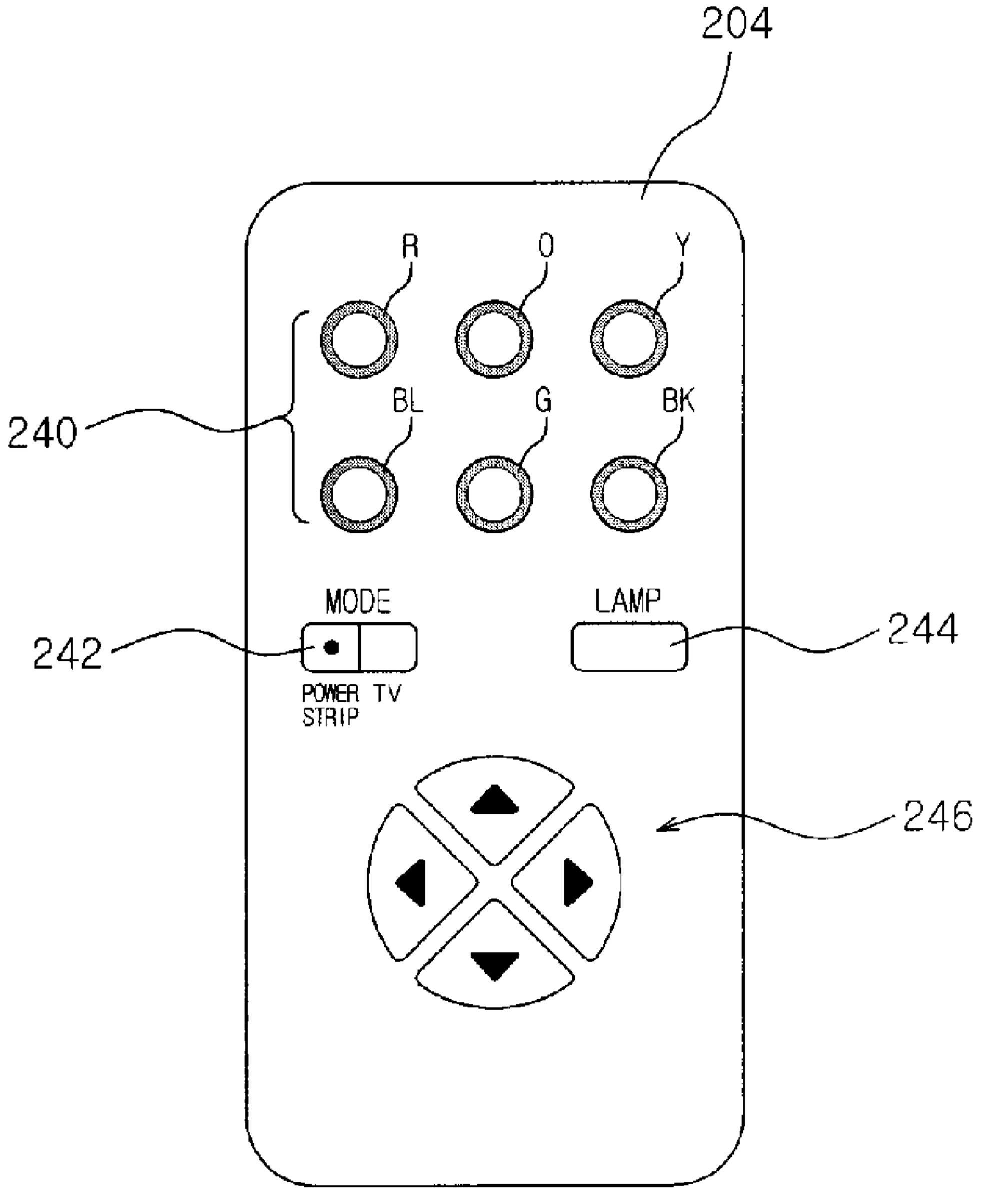
FIG. 9 is a view illustrating an external appearance of the remote controller in FIG. 8.

Meanwhile, the remote controller 204 in FIG. 6, as illustrated in FIG. 9, includes a socket controlling button unit 240 having socket controlling buttons as many as the number of the plural intermediate socket main bodies 202*k* provided in the main body 2 in which the same color indicators as the color indicators such as red R, orange O, yellow Y, blue BL, green G, and black BK, painted on the respective intermediate socket main bodies 202*k* are painted on the outer circumferences of the socket controlling buttons. The socket controlling buttons are, for example, transparent or semitransparent caps, and light emitting lamps LD1 to LD6 corresponding to the buttons are installed in a case of the remote controller 204 below the socket controlling buttons.

A keypad 236 (See FIG. 8) of the remote controller 204 includes a mode switch 242 to select one of a power strip mode and a television mode, a lamp button 244 to request to check statuses of the respective intermediate socket main bodies 202*k*, and an adjustment button 246 to adjust channels and volume at the television mode.

The remote controller 204 has a function of monitoring a status of supplying electric power to the intermediate socket main bodies 202*k*, a function of remotely controlling whether the electric power is supplied, and a television function.

Figure 8:
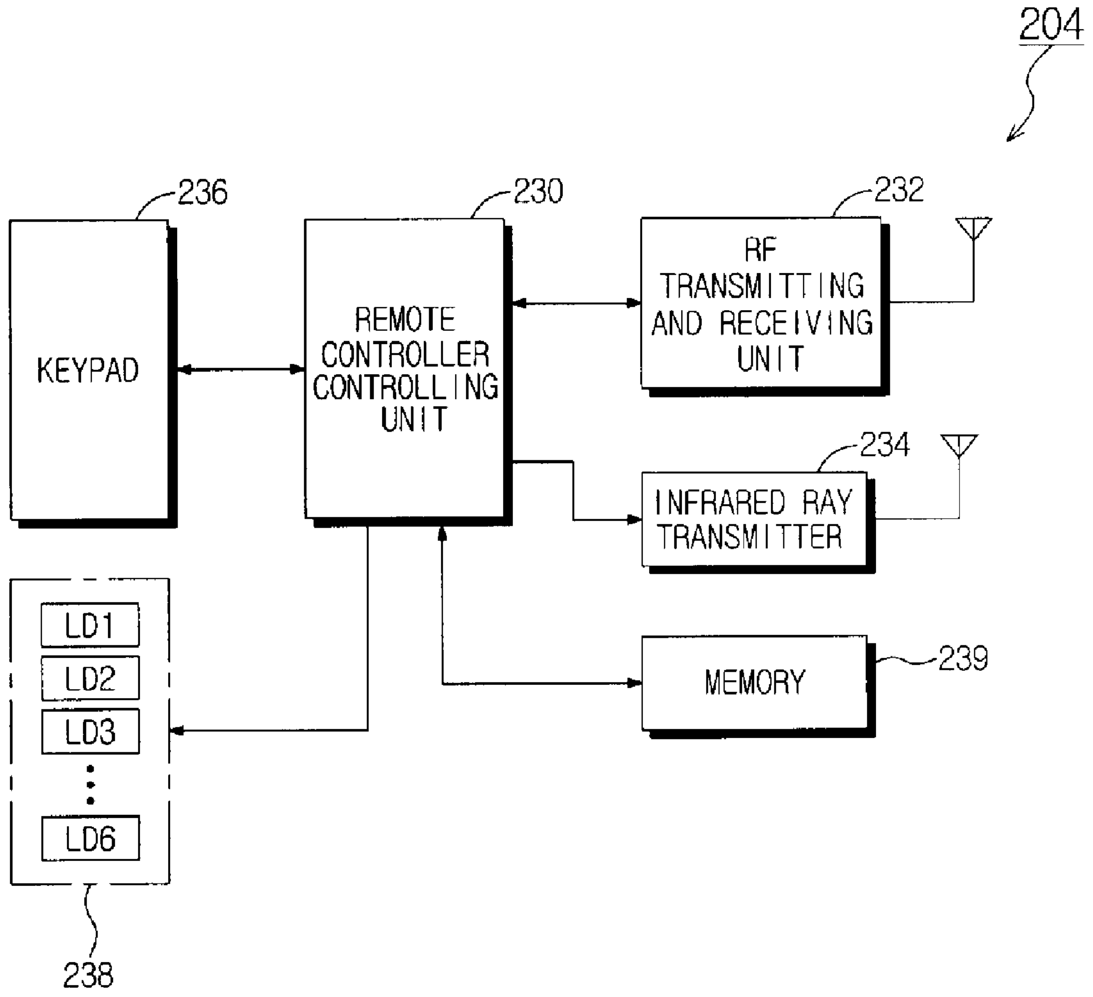
FIG. 8 is a block diagram illustrating a circuit of a remote controller of the intermediate type power strip in FIG. 6.

As illustrated in FIG. 8, an electric circuit of the remote controller 204 includes a remote controller controlling unit 230, a radio frequency (RF) transmitting and receiving unit 232, an infrared ray transmitter 234, a keypad 236, a light emitting lamp 238, and a memory 239.

The remote controller controlling unit 230 controls overall operation of the remote controller 204. Particularly, when key data corresponding to the lamp button 244 is inputted from the keypad 236, the remote controller controlling unit 230 requests the intermediate socket main bodies 202*k* to check statuses of switches through the RF transmitting and receiving unit 232, controls the light emitting lamps of the light emitting lamp unit 238 to be turned on or off according to a responses when the responses are received from the intermediate socket main bodies 202*k*, and transmits a switch remote controlling signal to a corresponding intermediate socket main body 202*k* (one of the intermediate socket main bodies 202*k*) through the RF transmitting and receiving unit 232 when the key data corresponding to a certain socket controlling button of the socket controlling button unit 240.

The RF transmitting and receiving unit 232 is a block to perform RF communication with the intermediate socket main bodies 202*k* at the commercial frequency broadband, the infrared ray transmitter 234 transmits an infrared signal to a television when the television mode is selected. The keypad 236 includes the socket controlling button unit 240, the mode switch 242, the lamp button 244, and the adjustment button 246 that are described with reference to FIG. 9, and supplies corresponding key data to the remote controller controlling unit 230 when the user presses a key. The light emitting lamp 238 includes three color light emitting lamps LD1 to LD6 installed in the lower sides of the socket controlling buttons as many as the number of the connecting sockets and are turned on or off under the control of the remote controller controlling unit 230.

The memory 239 is controlled by the remote controller controlling unit 230 and stores an operation program and data including allocation index codes with respect to the plural intermediate socket main bodies.

Figure 7:
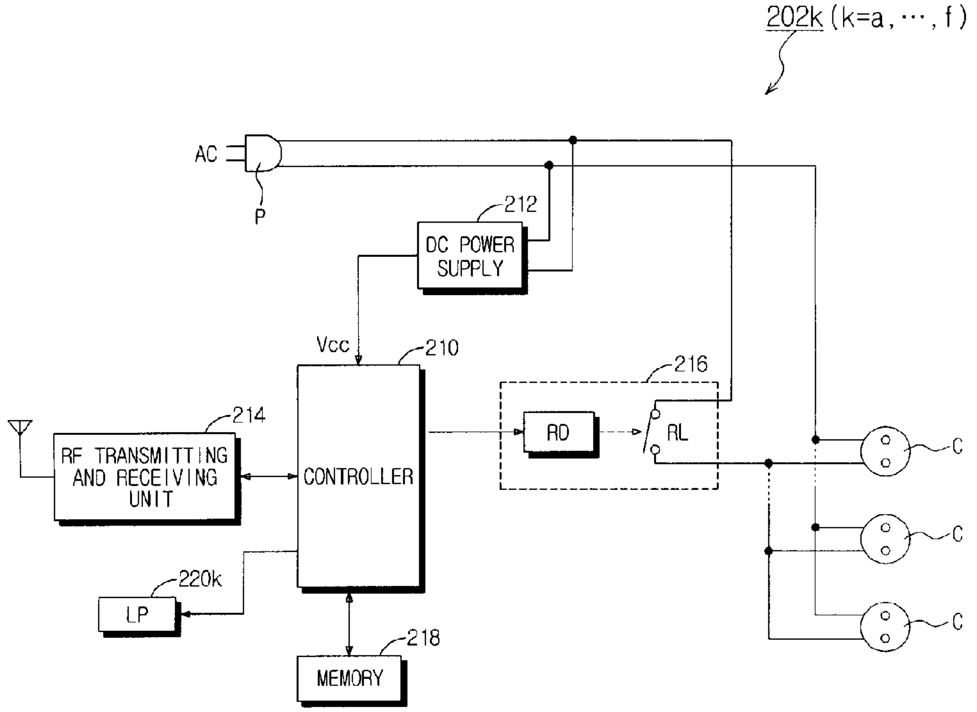
FIG. 7 is a block diagram illustrating each of circuits of main bodies of intermediate sockets of the intermediate type power strip in FIG. 6.

As illustrated in FIG. 7, each of the electric circuits of the intermediate socket main bodies 202*k* of the intermediate type power strip in FIG. 6 includes a controller 210, a direct current (DC) power supply 212, a radio frequency (RF) transmitting and receiving unit 214, a switching unit 216, a memory 218, and operating lamps 220*k* (k is one of a, b, c, d, e, and f).

The switching unit 216 includes a relay switch RL connected to a single connecting socket C or a plurality of connecting sockets C connected to each other in parallel, and a relay driving unit RD to control the relay switch RL to be switched under the controller 210 such that the commercial alternating current (AC) power supplying path is selectively formed to the single or plural connecting sockets S.

The RF transmitting and receiving unit 214 is a block to transmit and receive a radio frequency (RF) signal to and from the external remote controller 204 at the commercial frequency broadband, the DC power supply 212 converts the commercial power AC into the DC power and supplies the converted DC power to the controller 210 and other circuits. The plural operation lamps LP1 to LP6 of the operation lamp unit 20 are installed at upper sides of the connecting sockets C1 to C6 of the main body 2 as illustrated in FIG. 1 and are selectively turned on by the controller 10.

The operation lamps 220*k*, as illustrated in FIG. 6, are installed to the intermediate socket main bodies 202*k* one by one and turned on or off under the control of the controller 210.

In the memory 218 in FIG. 7, the operation program and the allocation index codes of the corresponding to the intermediate socket main bodies 202*k* are mapped, various data including the current status of the power switches are stored and read out under the control of the controller 210.

The controller 210 reads the current statuses of the power switches from the memory 218 according to the request to check the statuses of the power switches of the remote controller 204 applied through the RF transmitting and receiving unit 214 and transmits the current statuses of the power switches to the remote controller 204. The controller 210 controls the relay switch RL of the switching unit 216 to be switched based on the switch remote controlling signal from the remote controller 204 and controls the operation lamps 220*k* to be turned on or off. When the relay switch RL is switched on, the operation lamps 220*k* are turned on.

Figure 10:
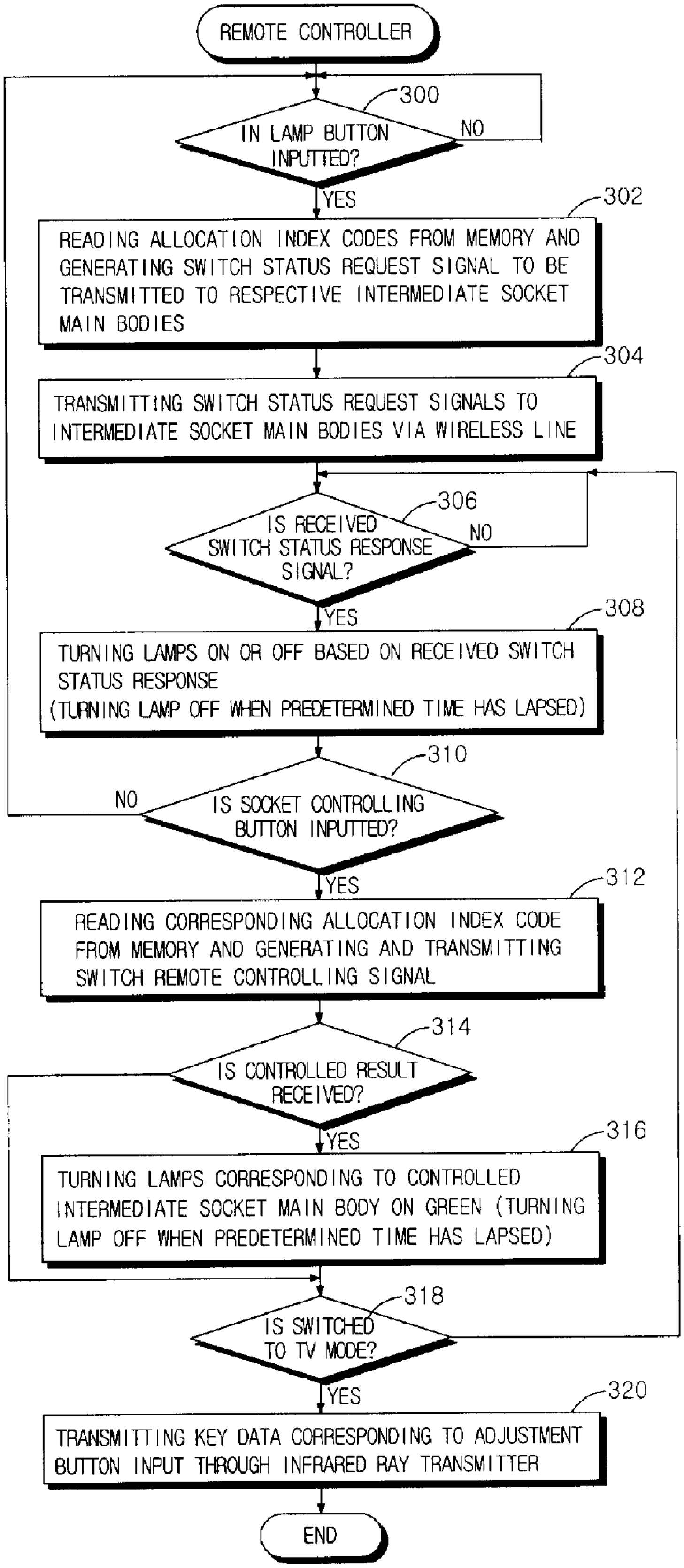
FIG. 10 is a flowchart illustrating a control performed by a remote controller controlling unit in FIG. 8.
Figure 11:
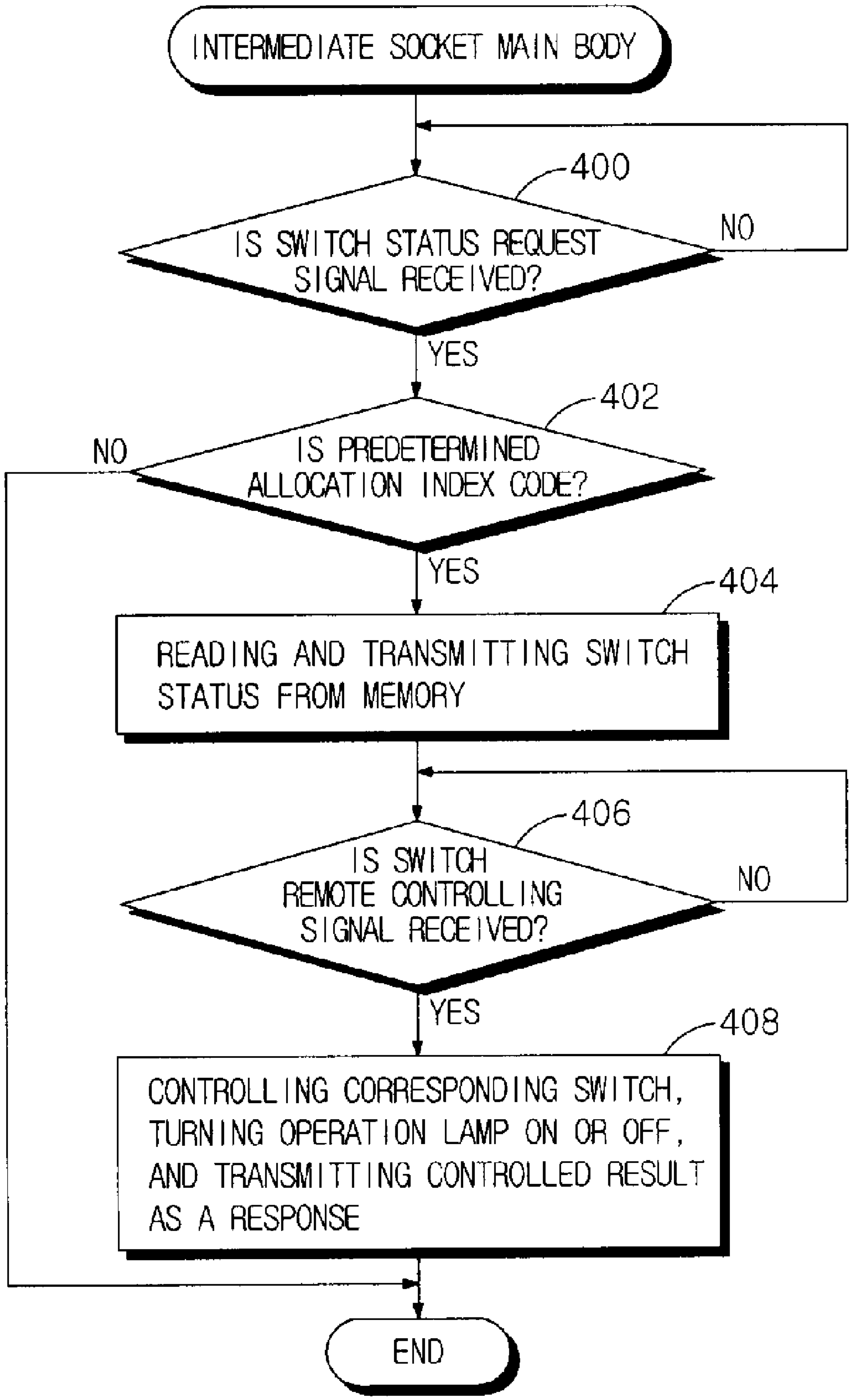
FIG. 11 is a flowchart illustrating a control performed by the controllers of the intermediate socket main bodies in FIG. 7.

FIG. 10 is a flowchart illustrating a control performed by the remote controller controlling unit 230 of the remote controller in FIG. 8, and FIG. 11 is a flowchart illustrating a control performed by the controllers 210 of the main body of the intermediate socket in FIG. 7.

Hereinafter, operation of the intermediate type power strip according to another embodiment of the present invention will be described in detail with reference to FIGS. 6 to 11 as follows.

The user may insert the plugs P of the plural intermediate socket main bodies 202*k* into desired sockets, for example, into the main sockets installed in a wall or into the multi-type power strip connected to the main sockets as many as desired. The plugs of the electric products are inserted into the connecting sockets C of the intermediate socket main bodies 202*k*.

As such, when the intermediate socket main bodies 202*k* are installed, the user uses the remote controller 204 to monitor overall statuses of the intermediate socket main bodies 202*k* and to control the intermediate socket main bodies 202 to supply electric power individually.

The respective controllers 210 of the entire intermediate socket main bodies 202*k* normally control the relay switches RL of the switching units 216 to be turned on, and simultaneously the entire operation lamps 220*k* to be turned on green. By doing so, the commercial power is supplied to the electric products whose plugs are inserted into the connecting sockets C of the intermediate socket main bodies 202*k*, and the operation lamps 220 of the respective intermediate socket main bodies 202*k* are turned on green.

However, the light emitting lamps LD1 to LD6, which are installed in the lower sides of the respective buttons of the socket controlling button unit 240 respectively corresponding to the intermediate socket main bodies 202*k* of the remote controller 204, are turned off initially, and are turned on or off according to the response for the request to check the statuses of the switches from the intermediate socket main bodies 202*k* after the user presses the lamp button 244 for the request.

In other words, when the user presses the lamp button 244 to request the status of the switches, the remote controller controlling unit 230 reads the allocation index codes stored in the memory to generate the request signals to check the statuses of the switches to be transmitted to the respective intermediate socket main bodies 202*k* (operations 300 and 302 in FIG. 10), and after that, transmits the request signals to check the statuses of the switches to the respective intermediate socket main bodies 202*k* through the RF transmitting and receiving unit 232 via a wireless line (operation 304 in FIG. 10).

By doing so, the controllers 210 of the respective intermediate socket main bodies 202*k* receive the request signals to check the statuses of the switches through the RF transmitting and receiving units 214 (operation 400 in FIG. 11). Each of the controllers 210 determines whether the received request signal is the allocation index code assigned to oneself, and if it is correct, the controller 210 reads the status of the switch stored in the memory 218 and transmits a response signal for the request to check the status of the switch to the remote controller 204 via a wireless line (operations 402 and 404 in FIG. 11).

When the response signals for the requests to check the statuses of the switches are received from the intermediate socket main bodies 202*k* (operation 306 in FIG. 10), the remote controller controlling unit 230 of the remote controller 204 controls the light emitting lamps LD1 to LD6 of the light emitting lamp unit 238 to be turned on or off based on the received response signals (operation 308 in FIG. 10). At this time, since the green lighting status of the light emitting lamp unit 238 of the remote controller 230 is controlled to be turned off after a predetermined time has lapsed (for example, about 30 seconds) by the remote controller controlling unit 230, a battery of the remote controller 204 can be reduced.

The user watches the statuses of turning the respective buttons of the socket controlling button unit 240 on or off to get hold the current statuses of the respective intermediate socket main bodies 202*k* and to individually control the desired intermediate socket main body 202*k* to supply electric power. Particularly, since the color indicators are identical to the color indicators on the upper circumferences of the respective intermediate socket main bodies 202*k*, the user can easily find the desired intermediate socket body 202*k* to supply electric power.

When the user presses one of among the buttons of the socket controlling button unit 240 corresponding to the desired intermediate socket main body 202*k* to be individually controlled, the remote controller controlling unit 230 of the remote controller 204 reads the corresponding allocation index code from the memory 239 and generates a switch remote controlling signal corresponding to the read allocation index code to transmit the switch remote controlling signal through the RF transmitting and receiving unit 232 via a wireless line (operations 310 and 312 in FIG. 10).

The controller 210 of the corresponding intermediate socket main body 202*k* receives the switch remote controlling signal to control the relay switch RL of the switching unit 216 to be switched and to turn the operation lamp 220*k* on or off (operations 406 and 408 in FIG. 11). Moreover, the controller 210 transmits a result of controlling the relay switch RL as an RF response to the remote controller 204 via a wireless line (operation in FIG. 11).

The remote controller controlling unit 230 of the remote controller 204 having received the RF response controls a light emitting lamp corresponding to the intermediate socket main body 202*k* that is newly controlled to supply electric power in remote, among the light emitting lamps LP1 to LP6 of the light emitting lamp unit 238 to be turned on green (operations 314 and 316 in FIG. 10). By doing so, the green lighting or turning-off of the button pressed by the user is directly indicated.

Due to the above-mentioned operations, the user can individually control the intermediate socket main bodies 202*k* to supply electric power remotely and can monitor the intermediate socket main bodies 202*k* according to the current statuses of supplying electric power to the intermediate socket main bodies 202*k*.

Meanwhile, the remote controller 204 can be used as a remote controller for a television in addition to the function of remotely and individually controlling the electric power to be supplied to the intermediate socket main bodies 202*k*.

In other words, since the mode switch 242 is provided on the keypad 236 of the remote controller 204, the user switches the mode switch 242 from "POWER STRIP" to "TV" so that the remote controller controlling unit 230 is switched to the television mode. In the television mode, the user presses the adjustment button 246 up, down, right, and left so that channels and volume of the television can be adjusted.

In more detailed description, when the user presses the adjustment button 246 up, down, right, and left at the television mode, the keypad 236 applies key data corresponding to the press of the adjustment button 246 to the remote controller controlling unit 230 and the remote controller controlling unit 230 detects the key data and transmits an infrared signal corresponding to the key data to the television through the infrared ray transmitter 234 (operations 318 and 320 in FIG. 10).

Although the short-range RF communication between the main bodies 2 and 202*k* of the power strip and the remote controllers 4 and 204 is described by the RF communication, it will be apparent to those skilled in the art that Bluetooth, WiFi, and the like can be used as the short-range RF communication.

INDUSTRIAL APPLICABILITY

The present invention can be applied to plugs of various electric products.

The invention claimed is:

1. A multi-type power strip comprising:

a first main body including a plurality of connecting sockets having surfaces indicated by priority of supplying electric power to the respective connecting sockets, first operation lamps, and an electric circuit installed in the first main body of the multi-type power strip; the electric circuit comprising:

a plurality of switches corresponding to the plural connecting sockets to selectively form a commercial power supplying path by a predetermined switch control;

a current detector to detect electric current flowing through a power cable of the multi-type power strip and to output a load status;

a radio frequency transmitting and receiving unit to transmit and receive a radio frequency signal to and from a remote controller; and a controller to control the switches to be switched based on a switch remote controlling signal of the remote controller through the radio frequency transmitting and receiving unit, and to control the plural switches to be switched based on a predetermined priority of supplying electric power when the output of the load status from the current detector exceeds a predetermined overload threshold;

wherein the remote controller includes:

a second main body having a plurality of buttons whose surfaces are indicated by priority of supplying electric power to the electric circuit; and second operation lamps respectively installed in the lower sides of the buttons.

2. The multi-type power strip according to claim 1, wherein the remote controller transmits the corresponding switch remote controlling signal to the first main body via a wireless line when a user presses a certain button among the plural buttons and the second operation lamps are controlled to be selectively turned on based on the radio frequency signal from the first main body.

3. The multi-type power strip according to claim 1, wherein the remote controller comprises:

a mode switch positioned on a keypad to select one of a power strip mode and a television mode; and an infrared ray transmitter to transmit an infrared signal to a television under the control of a controlling unit of the remote controller.

4. The multi-type power strip according to claim 2, wherein the remote controller comprises:

a mode switch positioned on a keypad to select one of a power strip mode and a television mode; and an infrared ray transmitter to transmit an infrared signal to a television under the control of a controlling unit of the remote controller.

5. The multi-type power strip according to claim 1, wherein the remote controller further comprises lamp button to request to check statuses of the respective connecting sockets of the first main body.

6. The multi-type power strip according to claim 3, wherein the remote controller further comprises an adjustment button to adjust channels and volume at the television mode.

7. The multi-type power strip according to claim 1, further comprising a memory for storing data related to the priority of supplying the electric power and data related to the predetermined overload threshold.

8. An intermediate type power strip comprising:

a plurality of intermediate socket main bodies inserted into sockets and respectively including at least one connecting socket;

a remote controller to individually control the plural intermediate socket main bodies in remote through a radio frequency communication;

wherein respective surfaces of the intermediate socket main bodies are distinguished by indicators;

wherein the remote controller comprises:

socket controlling buttons respectively corresponding to the plural intermediate socket main bodies;

light emitting lamps respectively corresponding to the socket controlling buttons; and an electric circuit;

wherein the electric circuit comprises:

a memory to store allocation index codes with respect to the respective intermediate socket main bodies;

a keypad including a lamp button to check statuses of the socket controlling buttons and respective switches installed in the respective intermediate socket main bodies to generate key data corresponding to a button that is pressed;

a radio frequency transmitting and receiving unit to perform a radio frequency communication with the intermediate socket main bodies; and a remote controller controlling unit to request to check the status of the switches to the intermediate socket main bodies through the radio frequency transmitting and receiving unit when the key data corresponding to the lamp button is inputted from the keypad, to control the light emitting lamps to be turned on or off according to a response for the request to check the statuses of the switches when the response for the request to check the statuses of the switches is received from the intermediate socket main bodies, and to transmit a switch remote controlling signal to a corresponding intermediate socket main body among the intermediate socket main bodies through the radio frequency transmitting and receiving unit via a wireless line when the key data corresponding to the socket controlling button is inputted.

9. The intermediate type power strip according to claim 8, wherein each of the intermediate socket main bodies comprises an operation lamp.

10. The intermediate type power strip according to claim 8, wherein the remote controller comprises:

a mode switch positioned on the keypad to select one of a power strip mode and a television mode; and an infrared ray transmitter to transmit an infrared signal to a television under the control of the remote controller controlling unit.

11. The intermediate type power strip according to claim 9, wherein the remote controller comprises:

a mode switch positioned on the keypad to select one of a power strip mode and a television mode; and an infrared ray transmitter to transmit an infrared signal to a television under the control of the remote controller controlling unit.

* * * * *